Patented Oct. 8, 1946

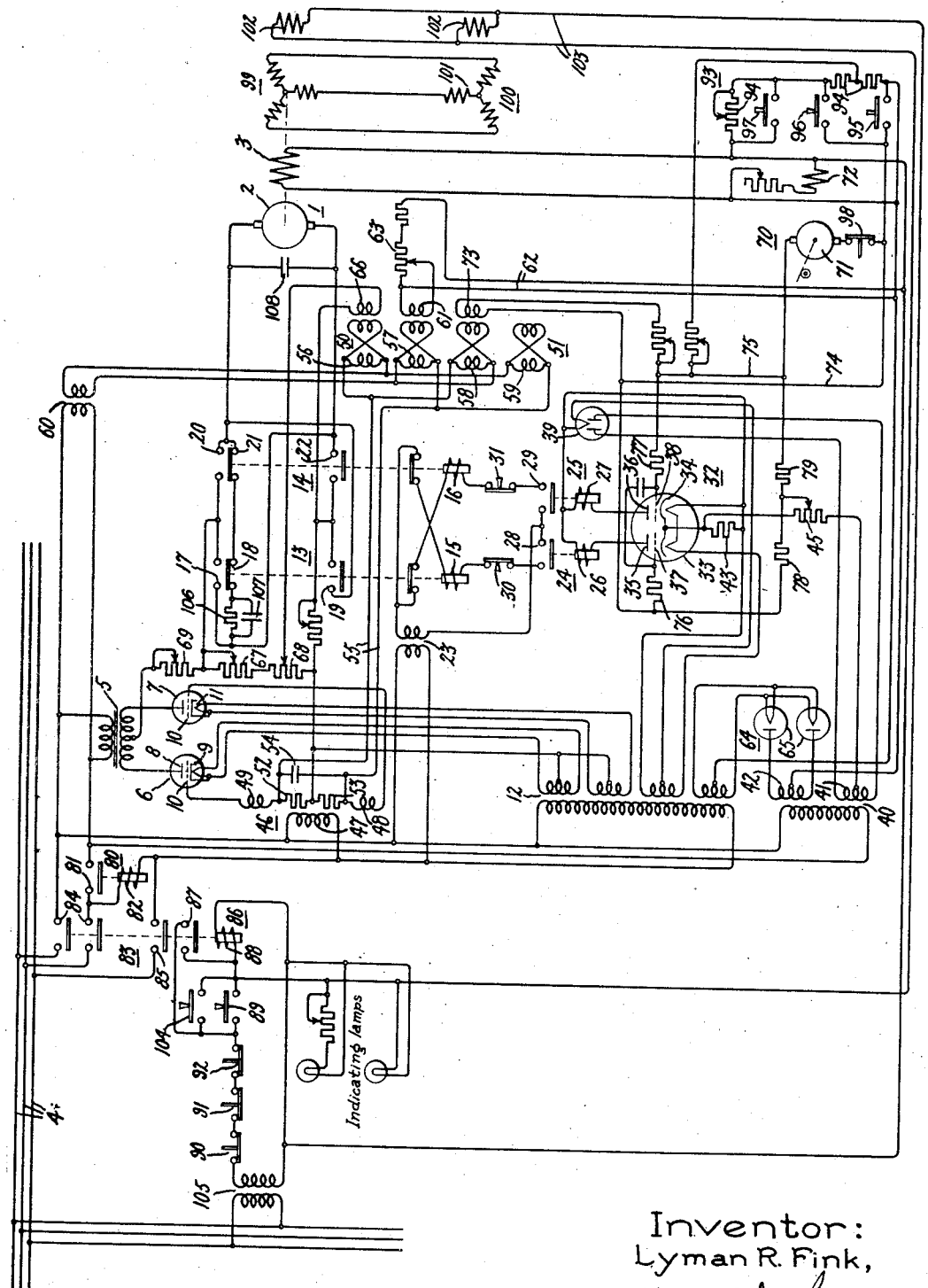

2,409,029

UNITED STATES PATENT OFFICE 2,409,029

ELECTRIC VALVE MOTOR CONTROL SYSTEM

Lyman R. Fink, Schenectady, N. Y., assignor to General Electric Company, a corporation of New York Application June 14, 1940, Serial No. 340,494

9 Claims. (Cl. 172—179)

My invention relates to electric valve motors systems and more particularly to electric systems employing electric valve apparatus for controlling or regulating dynamo-electric machines.

Due to the precision of control and operation of which electric valve translating apparatus is susceptible, apparatus of this nature has been applied to the control of dynamo-electric machines. In accordance with the teachings of my invention described hereinafter, I provide a new and improved electric valve motor control system of rugged construction and which is susceptible of greater precision of control and rapidity of response than the arrangements available heretofore.

It is an object of my invention to provide a new and improved control system for dynamo-electric machines.

It is another object of my invention to provide a new and improved electric valve motor control system for direct current motors.

It is a further object of my invention to provide a new and improved system for controlling the speed and direction of rotation of a direct current motor.

Briefly stated, in the illustrated embodiment of my invention I provide an electric valve translating system for controlling the speed and direction of rotation of a dynamo-electric machine, such as a direct current motor. The electric valve translating apparatus energizes one of the windings of the motor, such as the armature winding, from an alternating current circuit and a pair of reversing contactors are connected between the electric valve apparatus and the armature winding of the motor to control the polarity of the voltage impressed on the armature winding. The electric valve apparatus is of the controlled type and concurrently with the operation of the reversing contactors, the phase of the voltage impressed on the grids or control members of the electric valve is also controlled not only to vary the polarity of the voltage impressed on the armature but also to vary the magnitude of the voltage. In this manner the speed as well as the direction of rotation is controlled.

For a better understanding of my invention, reference may be had to the following description taken in connection with the accompanying drawing, and its scope will be pointed out in the appended claims. The single figure of the drawing diagrammatically illustrates an embodiment of my invention as applied to a system for controlling the speed of a direct current motor.

In the single figure of the accompanying drawing, I have diagrammatically illustrated my invention as applied to a system for controlling the speed and direction of rotation of a dynamo-electric machine, such as a direct current motor 1, having an armature winding 2 and a field winding 3. One of the windings, such as the armature winding 2, is energized from a suitable source of alternating current, such as alternating current circuit 4, through electric translating apparatus comprising a transformer 5 and electric valve means 6 and 7. The electric valve means 6 and 7 may be arranged to transmit both half cycles of the alternating current to armature winding 2 so that the system operates substantially as a full wave rectifier. The electric valve means 6 and 7 are preferably of the type employing an ionizable medium, such as a gas or a vapor, and each comprises an anode 8, a cathode 9 and a control member or grid 10 which controls the value of the average current conducted by the electric valve means. The electric valve means 6 and 7 are also provided with cathode heating elements or filaments 11 which may be energized from a suitable transformer 12 which is, in turn, energized from circuit 4.

As an agency for reversing the polarity of the unidirectional voltage impressed across armature winding 2 of motor 1, I provide suitable reversing contactor means, such as a pair of reversing contactors 13 and 14, which comprise actuating coils 15, 16 and contacts 17—19 and 20—22, respectively. As auxiliary relay means for selectively energizing the actuating coils 15 and 16, I provide a suitable source of current, such as a transformer 23, which may be energized from circuit 4, and a pair of auxiliary relays 24 and 25 having actuating coils 26, 27 and contacts 28 and 29, respectively. Suitable limit devices, such as switches 30 and 31, may be connected in series relation with the contacts of each of the last mentioned relays.

In order to energize selectively the actuating coils of the reversing contactors 13 and 14 and, hence, in order to control the polarity of the voltage impressed across armature 2 of motor 1 and to control the direction of rotation thereof, I provide a suitable control circuit 32 which may comprise an electric discharge device 33 comprising a pair of electric discharge paths having an electrically common cathode 34, anodes 35, 36 and associated grids 37 and 38, respectively. One of the electric discharge paths is connected in series relation with actuating coil 26 of auxiliary relay 24, and the other path is connected in series relation with actuating coil 27 of auxiliary relay 25. A suitable source of unidirectional current is provided to energize the circuits including the actuating coils 26 and 27 and the anode-cathode circuits of discharge device 33. This source of current may be provided by a rectifier arrangement comprising an electric discharge device 39 and a secondary 41 of transformer 40 which constitute a bi-phase rectifier to transmit unidirectional current through coils 26 and 27, electric discharge device 33 and through resistances 43 and 45.

To impress on the grids 10 of electric valve means 6 and 7 periodic voltages, such as alternating voltages having variable phase displacement with respect to the voltage of circuit 4, and to control thereby the magnitude of the voltage impressed across armature 2, I provide an excitation circuit including a transformer 46 having a primary winding 47 and secondary windings 48 and 49. The secondary windings 48 and 49 introduce into the excitation circuit alternating components of voltage of predetermined fixed phase relationship which are combined with a variable component of voltage produced by saturable inductive reactances 50 and 51 described hereinafter. A voltage divider, including resistances 52 and 53, is connected between secondary windings 48 and 49. A suitable phase shifting and filtering device, such as a capacitance 54, may be connected across resistances 52 and 53. The capacitance 54 serves to adjust the phase of the resultant voltage impressed on grids 10 in order to obtain the desired control of motor 1. A circuit 55 is connected to resistances 52 and 53 and introduces into the excitation circuit an alternating component of voltage of variable magnitude derived from the saturable reactances 50 and 51. The component of voltage introduced into the excitation circuit by circuit 55 is a variable magnitude alternating voltage which combines with the alternating component of voltage provided by transformer 46 to impress on the grids 10 alternating components of voltage of adjustable phase position relative to the respective anode-cathode voltages thereof.

As a means for providing an alternating component of voltage variable in phase with respect to the anode-cathode voltage of the electric valve means 6 and 7 and to control precisely the motor 1 so that it follows a predetermined controlling influence, such as a control voltage, I employ a circuit disclosed and broadly claimed in a copending patent application Serial No. 340,493, of G. H. Pettibone, filed concurrently herewith and assigned to the assignee of the present application. This system includes electric valve translating apparatus such as electric valves 6 and 7, and also includes a pair of saturable inductive devices having alternating current windings 56, 57 and 58, 59 which may be energized from the alternating current circuit 4 through a transformer 60. The windings 56 and 57 constitute opposite branches of an alternating current bridge, and windings 58 and 59 constitute the other branches of the bridge network. Reactances 50 and 51 are provided with a unidirectional magnetizing winding 61 which may be energized from a source of unidirectional current, such as a direct current circuit 62, through a voltage divider 63. Circuit 62 may be energized from a rectifier 64 comprising a pair of electric valves 65 and transformer winding 42 of transformer 40. Reactance 50 is also provided with a forcing or accelerating winding 66 which is energized in response to a predetermined controlling influence or influences, such as the armature voltage and current of motor 1. Winding 66 is connected to be energized in response to the armature current and voltage through a voltage divider comprising resistances 67 and 68. A suitable current limiting resistance 69 may be connected in series relation with the output circuit of electric valves 6 and 7 and the armature 2 of motor 1.

In order to control selectively the contactor mechanism, that is, to control selectively the energization of the actuating coils 15 and 16 and the associated auxiliary relays 24 and 25, I provide a suitable control means for providing a control voltage. This means may include a hand-operated device, such as a hand-cranked generator 70 of the direct current type having an armature winding 71 and a field winding 72. The polarity of the output or armature voltage of the generator 70 is dependent upon its direction of rotation inasmuch as the field winding 72 is energized in the same direction at all times by means of the rectifier 64. The output of the generator 70 impresses relatively variable control voltages on grids 37 and 38 of electric discharge device 33, and at the same time variably energizes control winding 73 of reactances 50 and 51. In this manner, the contactors 13 and 14 are controlled concurrently with the impression of signal voltage on grids 10 of electric valves 6 and 7. Armature 71 is connected to winding 73 through conductors 74 and 75, and the armature 71 is also connected to the grids 37 and 38 through resistances 76, 77 and 78, 79. The common juncture of resistances 78 and 79 may be connected to resistance 45 in order to adjust the amount of current transmitted through the discharge paths of electric discharge device 33 for different magnitudes of armature voltage of generator 70.

To initiate the operation of the system and to control the energization of the electric valve translating apparatus, I employ suitable time delay means or contactor 80 having power contacts 81 and an actuating coil 82. The contactor 80, in turn, is controlled by means of a contactor 83 having contacts 84 in series relation with the power circuit for the electric valve translating apparatus, and having control contacts 85 connected to energize the actuating coil 82 of contactor 80. An auxiliary relay 86 having interlocking contacts 87 and an actuating coil 88 is connected to initiate the energization of the system upon closure of a starting or initiating switch 89. Switches 90, 91 and 92 are employed to effect deenergization of coil 88 and hence to open the contactors 83 and 80.

In the event the generator 70 is not in condition for operation or in the event it is desired to control the voltage impressed on the grids 37 and 38 of discharge device 33 without use of the generator 70, I provide a circuit 93 comprising resistances 94 and hand-operated switches 95—98 which open the armature circuit of generator 70 and impress voltages of the desired polarity and magnitude on the grids 37 and 38 to control the polarity of the voltage impressed on armature 2 of motor 1. The circuit 93 also impresses a variable control voltage across the terminals of control winding 73 so that the phase of the voltage impressed on grids 10 is also variable, and the magnitude of the output voltage is varied accordingly, in this manner rendering the system independent of the hand-cranked generator 70.

Where the above described system is used to position an object or device (not shown) it may be desirable to indicate at a distance the rotational position of the motor and, hence, the rotational position of the object driven by the motor. In order to obtain this type of indication, I may employ a system including a pair of rotational positioning devices 99 and 100, each of which may comprise a polyphase stator winding 101 and a single phase field winding 102, the latter of which may be energized from the alternating current circuit 4 through a circuit 103, contactor 104 and transformer 105. It will be understood that the rotational or angular position of the movable member of device 100 follows that of the device 99.

Indicating means, such as indicating lamps, may be connected to circuit 103 to indicate when relay 86 is closed, thereby indicating that the system is energized.

As a means for absorbing rapidly the energy stored in the rotating armature of motor 1 whenever the control circuit is deenergized, and thus to stop rapidly the motor when the control signal is removed, I employ a parallel connected damping resistance 106 and a capacitance 107. These elements are connected across the armature motor terminals whenever both contactors 13 and 14 are deenergized. Another capacitor 108 may be connected directly across the armature terminals of motor 1. The capacitors 107 and 108 serve to minimize the arcing which would otherwise occur across the contactors 13 and 14 when the motor is quickly reversed in the direction of rotation, that is, when the contacts are re-opened before the current decreases to zero.

The operation of the embodiment of my invention shown in the single figure of the drawing will be explained by considering the system when it is desired to control the speed and direction of rotation of motor 1 in response to the output or armature voltage of generator 70. The system is initiated in its operation by the closure of switch 89 which energizes actuating coil 88 of auxiliary relay 86. This relay, in turn, closes the energizing circuit for time delay relay or contactor 89 and the electric translating apparatus, including transformer 5 and electric valve means 6 and 7, is energized from circuit 4.

The electric valve means 6 and 7 and the transformer 5 operate as a rectifier to impress across the terminals of armature 2 of motor 1 a unidirectional voltage, the magnitude of which is determined by the phase of the voltages impressed on grids 10 relative to the anode-cathode voltages of these electric valves.

The polarity of the voltage impressed on the armature 2 and hence the direction of rotation thereof is determined by the reversing contactors 13 and 14. When contactor 13 is energized, that is, when its associated contacts 17 and 19 are closed and its contact 18 is open, the lower terminal of the armature 2 is negative relative to the upper terminal; and when contactor 14 is energized, closing its contacts 20 and 22 and opening its contact 21, the upper terminal of the armature 2 is negative relative to the lower terminal. The operation of contactors 13 and 14 is selectively obtained by means of auxiliary relays 24 and 25 which are, in turn, controlled by the electric discharge device 33. The energization of coils 26 and 27 of auxiliary relays 24 and 25 is controlled by means of the variable potentials impressed on grids 37 and 38 of electric discharge device 33. When the potential of grid 37 is made more positive by means of the output voltage of generator 70, the associated discharge path thereof conducts a greater amount of current and increases the energization or increases the current conducted through actuating coil 26 to a value sufficient to close contacts 28 of relay 24. Upon decrease of the potential impressed on grid 37 and an increase in the positive direction of the potential impressed on grid 38, the current conducted through coil 26 is decreased and the current conducted through coil 27 is increased, thereby opening contacts 28 and closing contacts 29. In this manner selective energization of actuating coils 16 and 17 of contacts 13 and 14 is obtained. The relative magnitude and polarity of the voltages impressed on grids 37 and 38 is, of course, determined by the speed and the direction of rotation of the hand-cranked generator 70.

In addition to controlling the voltages impressed on grids 37 and 38 of discharge device 33, the hand-cranked generator 70 also controls the energization of control winding 73 of reactances 50 and 51, and thereby controls the phase of the voltage impressed on grids 10 of electric valve means 6 and 7. This control in the phase of the resultant voltage impressed on grids 10 is effected concurrently with the selective energization of the actuating coils 15 and 16 of reversing contactors 13 and 14.

It will be understood that the magnitude of the average voltage impressed on the armature 2 of motor 1 by electric valves 6 and 7 is determined by the phase relationship between the voltages impressed on the grids 10 of these electric valves and the voltage of circuit 4 or the anode-cathode voltage of these valves. The magnitude of the average voltage is increased as the grid voltages are advanced from a lagging position to the zero position of the positive half cycles of applied anode-cathode voltage and is, of course, decreased as the phase relation of the grid voltages is retarded.

Due to the energization of forcing coil 66 which is controlled in response to the armature voltage and armature current of motor 1, the magnitude of the voltage introduced by reactances 50 and 51 is made to follow precisely the magnitude and polarity of the output voltage of generator 70. In this manner the speed and direction of rotation of motor 1 are controlled by the magnitude and polarity of the armature voltage of the generator 70.

In the event it is not desired to employ the generator 70 for operating the system, switches 95—98 may be employed to impress control voltages on grids 37 and 38 of discharge device 33 and to energize variably coil 73 of reactances 50 and 51.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current circuit, a dynamo-electric machine having an armature winding and a field winding, electric translating apparatus energized from said circuit and including electric valve means, reversing switching means connected between said electric valve means and one of the windings of said machine for controlling the polarity of the voltage impressed thereacross, said switching means having an actuating means, control means for said electric valve means to control the magnitude of the voltage supplied to said one winding, means for energizing said actuating means selectively to control the polarity of the voltage impressed across said one winding and including an electric discharge device having a control grid, means for impressing a control voltage on said grid to control the polarity of the voltage impressed across said one winding and means responsive to said control voltage for controlling the output voltage of said electric valve means.

2. In combination, an alternating current circuit, a dynamo-electric machine having an armature winding and a field winding, electric translating apparatus energized from said alternating current circuit and comprising an electric valve means connected to one of the windings of said machine, a pair of reversing contactors connected between said electric valve means and said one winding to control the polarity of the voltage impressed thereacross each of said contactors including an actuating coil, control means for said electric valve means to control the magnitude of the voltage supplied to said one winding, means for selectively energizing the coils comprising an electric discharge device including a pair of electric discharge paths each having an anode and an associated control grid, means for supplying current to said electric discharge paths, a control device, and means responsive to said control device for controlling said control means and for impressing relatively variable potentials on the grids to control the polarity of the voltage impressed across said one winding.

3. In combination, an alternating current circuit, a direct current motor having an armature winding and a field winding, electric translating apparatus energized from said alternating current circuit and including a rectifier, a pair of reversing contactors connected between said rectifier and said armature winding to control the polarity of the voltage applied to said armature winding, control means for said rectifier to control the magnitude of the voltage supplied to said armature winding, each of said contactor mechanisms comprising an actuating coil, means for selectively energizing said actuating coils comprising an electric discharge device including two electric discharge paths each having an anode and an associated control grid, a control device, and means responsive to said control device for controlling said control means and for impressing relatively variable potentials on the grids to energize selectively said coils.

4. In combination, an alternating current circuit, a dynamo-electric machine of the direct current type having an armature winding and a field winding, electric translating apparatus connected to said armature winding and comprising a full wave rectifier including electric valve means having a control member, a reversing contactor mechanism connected between said rectifier and said armature winding for controlling the polarity of the voltage impressed across said armature winding, said reversing contactor mechanism including a pair of actuating coils, means for selectively energizing said actuating coils to actuate said contactor mechanism comprising an electric discharge device including a pair of electric discharge paths each having an anode and a control grid, means for supplying direct current to said pair of electric discharge paths, a control device, and means responsive to said control device for energizing said control member to control the magnitude of the voltage supplied to said armature winding and for impressing on the grids relatively variable potentials to cause selective energization of said coils.

5. In combination, an alternating current circuit, a dynamo-electric machine having an armature winding and a field winding, electric translating apparatus energized from said circuit and including a rectifier comprising an electric valve having a control member, a pair of reversing contactors connected between said electric valve and one of the windings of said machine to control the polarity of the voltage impressed thereacross, each of said contactors having an actuating coil, means for selectively energizing the actuating coils comprising an electric discharge device having control means, an excitation circuit for impressing on said control member a periodic voltage of variable phase displacement with respect to the voltage of said alternating current circuit and comprising a saturable inductive device having a control winding, and means for variably energizing said control winding and for impressing a control voltage on said control means to control the magnitude and polarity of the voltage impressed across said one winding.

6. In combination, an alternating current circuit, a direct current motor having an armature winding and a field winding, electric translating apparatus energized from said circuit for transmitting current to said armature winding and including a pair of electric valves connected to transmit both half cycles of current of said circuit and each including a control member for controlling the current conducted thereby, a pair of reversing contactors connected between said electric valve means and said armature winding for controlling the polarity of the voltage applied to said armature winding and each having an actuating coil, means for selectively energizing the actuating coils comprising an electric discharge device including a pair of electric discharge paths each having an anode and an associated grid, an excitation circuit for impressing on said control members periodic voltages of variable phase displacement with respect to the voltage of said alternating current circuit and comprising a saturable inductive device having a control winding, and means for variably energizing said control winding and for impressing on said control grids relatively variable voltages to control the phase of said periodic voltages and to control the magnitude of the voltage applied to said armature winding.

7. In combination, an alternating current circuit, a dynamo-electric machine having an armature winding and a field winding, electric translating apparatus energized from said alternating current circuit and comprising an electric valve means connected to one of the windings of said machine, said electric valve means comprising a control member, a pair of reversing contactors connected between said electric valve means and said one winding to control the polarity of the voltage impressed thereacross, each of said contactors including an actuating coil, means for selectively energizing the coils comprising an electric discharge device including a pair of electric discharge paths each having an anode and an associated control grid, means for supplying current to said electric discharge paths, and a hand-operated generator of the direct current type for impressing a control voltage of variable phase on the control member of said electric valve means and control voltages of relatively variable magnitude and polarity on the control grids of said discharge paths to control the magnitude and polarity of the voltage impressed across said one winding.

8. In combination, an alternating current circuit, a dynamo-electric machine having an armature winding and a field winding, electric translating apparatus energized from said alternating current circuit for energizing said armature winding, a pair of reversing contactors connected between said translating apparatus and said armature winding to control the polarity of the voltage impressed thereacross, means for absorbing the energy of rotation of said motor and comprising a damping resistance, said pair of reversing contactors serving to connect said resistance across said armature winding when both said reversing contactors are in a deenergized condition, and means for reducing the sparking across said reversing contactors and for absorbing rotational energy from the dynamo-electric machine comprising a capacitance connected in parallel relation with said resistance.

9. In combination, an alternating current circuit, a dynamo-electric machine having an armature winding and a field winding, electric translating apparatus energized from said alternating current circuit for energizing said armature winding, a pair of reversing contactors connected between said translating apparatus and said armature winding to control the polarity of the voltage impressed thereacross, means for absorbing the energy of rotation of said motor and comprising a damping resistance, said pair of reversing contactors serving to connect said resistance across said armature winding when both said reversing contactors are in a deenergized condition, and means for reducing the sparking across said contactors and for absorbing rotational energy from the dynamo-electric machine comprising a pair of capacitances one of which is connected across said resistance and the other of which is connected across said armature winding.

LYMAN R. FINK.